United States Patent [19]

Sabarly

[11] 4,037,784
[45] July 26, 1977

[54] STEAM TRAP

[75] Inventor: Louis J. Sabarly, Paris, France

[73] Assignee: Societe Industrielle des Charmilles, Paris, France

[21] Appl. No.: 672,670

[22] Filed: Apr. 1, 1976

[30] Foreign Application Priority Data

Apr. 10, 1975 France .............................. 75.11236

[51] Int. Cl.² .............................................. F16T 1/10
[52] U.S. Cl. .................................. 236/56; 236/93 A;
 236/99 R; 137/182; 137/183; 137/845; 137/859
[58] Field of Search ................... 236/56, 58, 42, 99 R,
 236/59, 93 A; 138/41, 42, 44, 45; 137/183, 845,
 859, 182, 184

[56] References Cited

U.S. PATENT DOCUMENTS

| 986,797 | 3/1911 | Boegen | 137/182 |
|---|---|---|---|
| 2,585,863 | 2/1952 | Smith | 137/859 |
| 2,644,663 | 7/1953 | Klingler | 137/845 |
| 3,401,867 | 9/1968 | Long et al. | 137/845 |
| 3,433,243 | 3/1969 | Schroder et al. | 137/183 |
| 3,620,449 | 11/1971 | Hohn | 236/56 |
| 3,679,131 | 7/1972 | Hohn et al. | 236/59 |
| Re. 26,235 | 7/1967 | Woodford | 137/845 |

FOREIGN PATENT DOCUMENTS 662,339  6/1938  Germany .............................. 137/183

Primary Examiner—John J. Camby
Assistant Examiner—Henry C. Yuen
Attorney, Agent, or Firm—Learman & McCulloch

[57] ABSTRACT

A steam trap allowing the escape of condensate from a working fluid of steam comprises an escape valve mounted in a chamber in which the working fluid flows. The escape valve includes a valve seat member and a deformable metal diaphragm normally closing the steam trap and preventing the escape of steam. The diaphragm closes a housing in which a control fluid of water initially only partially fills the housing to which a vacuum is later applied. The housing bears along the periphery of the diaphragm where the diaphragm is supported by a shoulder in the valve seat member. The valve seat member includes a cylindrical central chamber radially inwardly of the valve seat and an annular chamber radially outwardly of the valve seat. The cylindrical chamber is larger in diameter than and upstream of an escape passageway for carrying away condensate also in the valve seat member. The annular chamber is in communication through a check valve and passages with the chamber in which the escape valve is mounted. Accordingly the pressure of the working fluid is exerted against the corresponding outer annular portion of the diaphragm in communication with the annular chamber and preponderates over the pressure in the enclosures when there is condensate in the chamber in which the steam is mounted.

7 Claims, 3 Drawing Figures

U.S. Patent          July 26, 1977          4,037,784
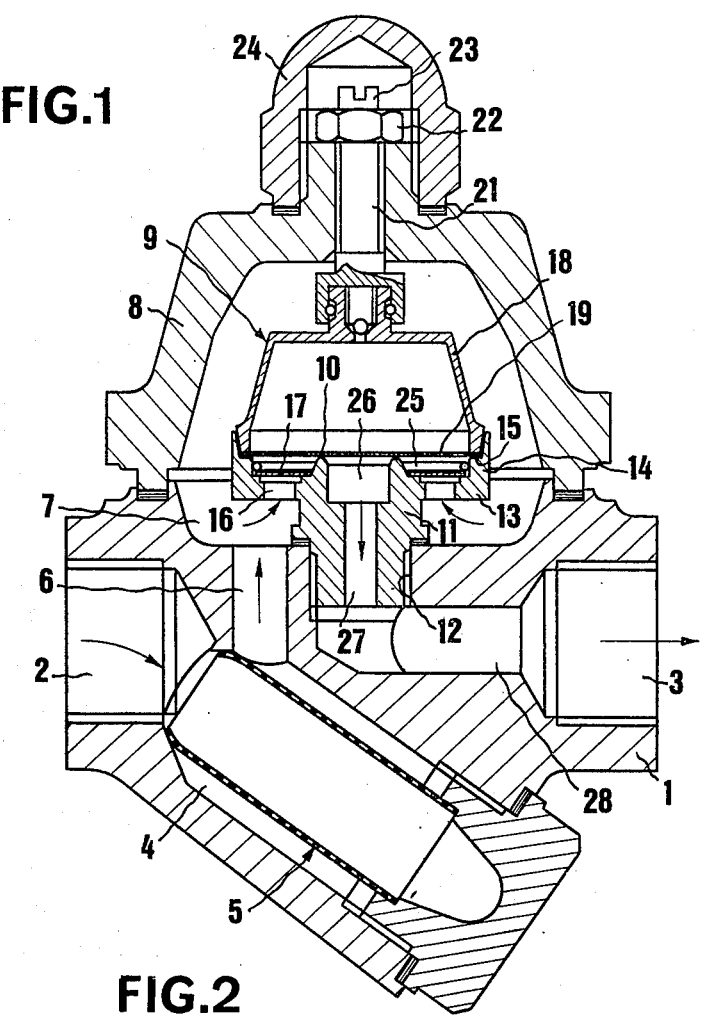
FIG.1
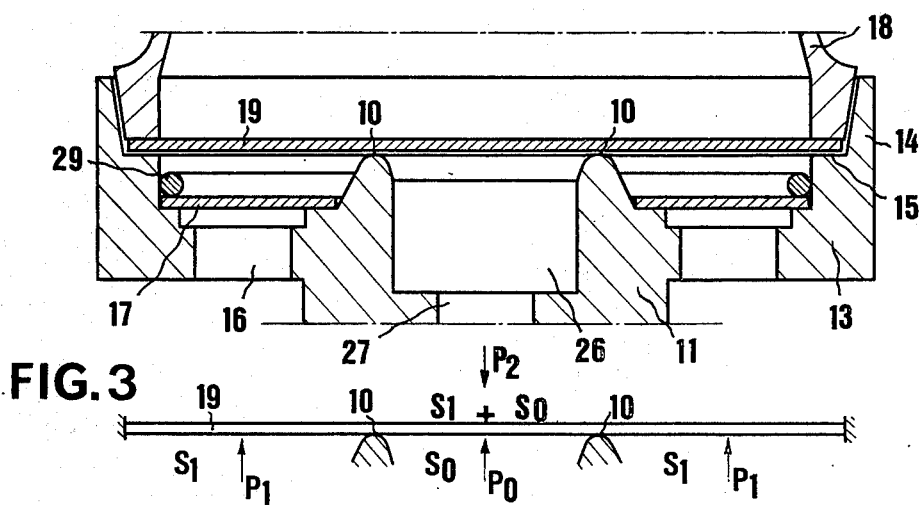
FIG.2
FIG.3

STEAM TRAP

The present invention relates to steam traps for draining condensates which are formed in all kinds of equipment using or conveying steam, and more particularly to steam traps of the type comprising an escape valve including a fixed valve seat and a deformable metal diaphragm adapted to bear against the valve seat and subjected to the pressure of the working fluid on one side and the pressure of the thermosensitive control fluid enclosed in a constant-temperature housing closed by the diaphragm on the other side, the working fluid flowing around the constant-temperature housing.

Steam traps of this type are known in which the working fluid which is water does not entirely fill the constant-temperature housing, the vacuum being produced inside the housing after the water is introduced.

The present invention relates more particularly to the last-mentioned type of steam trap and has as an object the improvement thereof in order to make it more efficient, reliable, and easier to use and adjust.

To this end, a more particular object of the invention consists in a steam trap adapted to remove condensation products of the type comprising an escape valve including a fixed valve seat and a deformable metal diaphragm adapted to bear against the valve seat, the diaphragm being subjected to the pressure of the working fluid on one side and the pressure of the control fluid on the other side, the control fluid being water which is enclosed in a housing, under vacuum, closed off by the diaphragm, the working fluid flowing around the housing, wherein the valve seat is annular and coaxial of the housing and of the escape passageway for the condensates, the valve seat separating, in the closed position of the steam trap, a cylindrical chamber ahead of the escape passageway, the diameter of the cylindrical chamber being greater than that of the escape passageway, from the cylindrical chamber an annular chamber coaxial of the steam trap disposed in the body of the valve seat and communicating through passages with the chamber in which the escape valve is mounted.

Such a steam trap is advantageous, namely, due to the particular structure of the valve seat which enables adjustment of the temperature of the condensate upstream of the stream trap by varying the ratio of the surfaces of the diaphragm subjected, in its closed position, to the upstream and downstream pressure.

Preferably, the diaphragm and through it the housing bear, in the closed position of the steam trap, against the annular valve seat and a peripheral shoulder in the valve seat member, the housing and diaphragm combination or enclosure being removably mounted on the valve seat member, with means accessible from outside the steam trap for enabling the axial displacement of the combination of the housing and diaphragm for flushing out associated pipes.

According to another aspect of the invention, the annular chamber includes a check valve adapted to seal off the said passages communicating with the chamber in which the escape valve is mounted, the check valve comprising a flat annular flexible metal ring held along its inner or outer periphery in the valve seat member and bearing against ports in the said passages.

Such a ring tends to take on a conical shape as soon as the flow rate reaches a predetermined level, and in response to back pressure, it bears against the inlet ports for the working fluid thereby blocking all flow.

Other features and advantages will become apparent from the description of a preferred embodiment of the invention, given solely by way of example, in respect of the accompanying drawing, in which:

FIG. 1 shows a longitudinal sectional view of a steam trap according to the invention;

FIG. 2 shows an enlarged detail, partly in section, of the escape valve seat; and FIG. 3 schematically illustrates the diaphragm on its valve seat.

The steam trap shown in the drawing comprises a body member 1 having a fluid inlet and outlet passages 2 and 3, respectively, for working fluid.

The inlet passage 2 communicates with a chamber 4 located in the lower part of the steam trap; a filter 5 is provided in the chamber 4.

The chamber 4 communicates through a bore 6 with the working fluid chamber 7 in which the escape valve is mounted.

The chamber 7 is formed by a recess in the top portion of the body member 1 and by a bellshaped cover 8 fitted and secured on the body member 1 by any appropriate means.

The escape valve comprises a capsule or enclosure 9 and an annular valve seat 10.

The valve seat 10 is integrally formed in a valve seat member 11 screwed into a tapped hole 12 in the body member 1 of the steam trap.

The valve seat member 11 is provided with a flanged collar 13 generally set back from the valve seat 10 and extended by a cylindrical sleeve 14 coaxial of the valve seat 10.

The sleeve 14 has on its inner surface a circular shoulder 15 level with the valve seat 10.

The flanged collar 13 is provided with a number of passages 16 communicating with the working fluid chamber 7 and closed off by a check valve member 17.

The capsule or enclosure 9 includes a housing 18 shaped as a body of revolution and closed at its lower end with a thin deformable circular metal diaphragm 19 bearing against the valve seat 10 and the shoulder 15; a lip on the sleeve extends 14 slightly beyond the end of the housing.

Contact between the upper lip on the sleeve 14 and the periphery of the housing 18 is preferably along a frustoconical bearing surface, preventing the clogging thereof and enabling precision centering of the capsule or enclosure.

Preferably, the diaphragm 19 is bonded to the housng 18 by laser welding which avoids any structural changes in the diaphragm.

A spindle 21 is fixed to the top of the housing 18, extends through the cover 8 and is accessible from the outside the steam trap.

The spindle 21 is threaded and threadedly engages the cover 8. A lock nut 22 is provided near the upper end of the spindle 21 which has a slotted head 23 for receiving a screwdriver, or the like, for turning the spindle 21 and displacing it axially.

The nut 22 and slotted head 23 of the spindle 21 are enclosed in a screw cap 24 threadedly mating with the cover 8.

The diaphragm 19 divides the enclosure formed by the housing 18 in combination with the flanged collar 13 into two chambers, the lower 25 of which communicates with the chamber 7 through the passages 16 and the upper of which is on the opposite side of the diaphragm.

Radially inwardly of the annular valve seat 10, is a cylindrical chamber 26 communicating with a bore or passageway 27 in the valve seat member having a diameter less than that of the chamber 26.

The bore or escape passageway 27 runs into another bore 28 which communicates with the fluid outlet passage 3.

FIG. 2 shows, in greater detail, the annular valve seat 10 and the check valve 17.

The valve seat 10 has a rounded operative surface which extends into the chamber 25 and against which the diaphragm 19 bears (not shown in FIG. 2).

The check valve 17 comprises an annular thin, flexible metal ring overlying the parts 16 and retained by an O-ring 29 disposed at the outer peripheral edge thereof.

The operation of the steam trap just described is as follows:

In a known manner, the upper chamber of the capsule or enclosure 9 is partially filled with water; a vaccum is applied after the water is introduced into the capsule so that there is sufficient room for the water to transform into saturated steam when heated. The water vaporizes according to the saturated steam curve; the source of heat is the high temperature working fluid condensate surrounding the capsule.

The pressure inside the upper chamber of the capsule or enclosure 9 bears against the diaphragm 19 which is capable of opening or closing the condensate escape passages.

With steam in the chamber 7 the pressure and temperature are practically the same in the upper chamber of the capsule 9 and in the chamber 7. The pressure exerted on the diaphragm 19 from both sides is practically identical, but since the inner area of the diaphragm confronting the control fluid in the capsule 9 is greater than the outer area (between the valve seat and the sleeve 14), in contact with the pressure of steam in the chamber 7, the force exerted on the inner surface of the diaphragm 19 therefore preponderates and determines the position of the diaphragm 19 relative to the valve seat 10, i.e., the closed position of the escape passages and therefore the steam trap.

On the other hand, with condensate in chamber 7, the the pressure therein is the same but the temperature decreases causing a drop in pressure in the upper chamber of the capsule 9. The force exerted against the inner surface of the diaphragm 19 decreases; the pressure force exerted on the outer surface of the diaphragm then preponderates thereby causing the diaphragm 19 to move away from the valve seat 10. Condensate then flows in the direction of the arrows in FIG. 1.

Reference will now be made to FIG. 3 which schematically represents the diaphragm 19 resting on the valve seat 10 which is subjected along its inner surface ($S1 + So$) to the pressure $P_2$ inside the capsule and on its outer annular surface $S1$ to the upstream pressure $P1$ (for which the saturating temperature is $01$) and on its outer circular central zone surface so to the downstream escape pressure $Po$.

It is considered desirable for the steam trap to be opened as long as the upstream pressure P1 of the entering fluid is at a temperature less than that of the saturated steam corresponding to the pressure P1 and to be closed at temperatures thereabove.

The pressure P1 and the temperature T1 of the supply steam are constants characterizing the live supply steam of the associated equipment, the escape of condensate is controlled by the steam trap. The temperature 01 is also constant.

Po is a variable (back-pressure) but also less than P1.

The condensates in the stream trap are at the pressure P1 and temperature $t1$, $t1$ being between ambient temperature and 01.

The steam trap may be represented by its diaphragm or disc which is subjected to the escape pressure P1 along the outer annular surface S1 and the pressure $po$ along the central zone of the outer surface $So$, and on its opposite surface $S1 + So$ to the pressure P2 (P2 being an increasing function exclusively of $t1$; $P2 = f(t1)$.

The steam trap is closed if:

$$P2 (S1 + So) > P1 \cdot S1 + Po \cdot So,$$

and open if:

$$P2 (S1 + So) < P1 \cdot S1 + Po \cdot So,$$

and theoretically in equilibrium if:

$$P2 = \frac{P1 \cdot S1 + Po \cdot So}{S1 + So} = P1 \frac{1 + \frac{PoSo}{P1 S1}}{\left(1 + \frac{So}{S1}\right)}$$

Therefore, the escaping condensate will also be at a temperature less than T1. The steam trap will therefore never allow steam to escape.

Since the pressure P2 inside is directly a function of the temperature $\theta T$, the temperature $\Delta T$ of the condensate escaping can be varied by changing the values S1 and So.

If S1 increases, the product S1P1 increases and since P2 is less than P1, the closed rest or equilibrium condition will be more rapidly broken.

On the other hand, if So increases, S1 decreases, therefore S1·P1 also decreases in relation to the interior forces (S1 +So) P2, P2 still being a function of the temperature $\theta1$. It is noted that there must be a large drop in T1 to bring P2 to a value so that $(S1+ So) P2 = S1P1 = SoPo$.

Changes in the ratio of th surfaces S1,So therefoe enable changes in the forces, and since P2 is a function of $\theta1$, the temperature $\theta1$ may be varied by varying the ratio of th surfaces S1 and So.

The present steam trap has a valve seat which has been designed to avoid, during variations in the flow rate and particularly when closure is imminent, unbearable high-pitched whistling which occurs frequently with steam traps of this type and is caused by vibrations of the diaphragm.

This whistling is eliminated by the construction and the particular arrangement of the annular valve seat in accordance with the foregoing description and by the provision of a chamber 26 which forms, with the bore or escape passageway 27 of reduced diameter, a shoulder (unnumbered) disposed in the flow path of the condensate so that the chamber 26 forms an anti-vibration swirl chamber, the side walls of the annular valve seat carrying the flow while eliminating all distrubances which might generate vibrations in the diaphragm.

By means of another advantage of the steam trap according to the invention, the mounting of the capsule 9 enables axial displacement of the same relative to the valve seat 10 and therefore gives the possibility of cleaning the pipes by flushing while the steam trap is in operation. With this in mind, the screw cap 24 is removed and the nut 22 is loosened and the spindle 21 unscrewed thereby lifting the valve seat including the shoulder 15.

The function of the check valve 17 is to close off ports in the passages 16 in case of back pressure thereby cutting off fluid flow; the check valve takes on a conical shape as soon as the flow reaches a predetermined high level which allows the free flow of condensate towards the chamber 26.

The housing 18 may be of any particular shape but is preferably a body of revolution.

What is claimed is:

1. A steam trap construction for allowing the escape of condensate of and from a working fluid under pressure and adapted for mounting in a body having a working fluid chamber communicating with a working fluid inlet and selectively communicating with or closed off from a condensate outlet, said trap construction comprising an enclosure carried by said body, a deformable metal diaphragm carried by said enclosure and dividing the latter into a first chamber and a second chamber, control fluid means in said first chamber under pressure, an annular valve seat extending into said second chamber and communicating via passage means with said outlet, one face of said diaphragm confronting and being capable of seating on said valve seat and its opposite face being exposed to said control fluid, and fluid passage means establishing communication between said working fluid chamber and said second chamber of said enclosure radially outwardly of said valve seat, said diaphragm being deformable to a position off said valve seat when the pressure of said working fluid acting on said one face of said diaphragm exceeds the pressure of said control fluid acting on the opposite face of said diaphragm, whereby fluid may pass from said second chamber into said outlet via said passage means, the area of said one face of said diaphragm exposed to said working fluid being less then the area of the opposite face of said diaphragm exposed to said control fluid when said diaphragm is seated on said valve seat.

2. A construction according to claim 1 including check valve means carried by said enclosure for enabling said working fluid to flow into said second chamber in a direction from said working fluid only.

3. A construction according to claim 2 wherein said check valve means comprises an annular, flexible ring overlying said passage means.

4. A construction according to claim 3 including retaining means overlying a peripheral edge of said ring.

5. A construction according to claim 3 wherein said retaining means overlies said ring at its outer periphery.

6. A construction according to claim 3 wherein said retaining means overlies said ring at its inner periphery.

7. A construction according to claim 1 including means accessible externally of said body for displacing said enclosure.

* * * * *

UNITED STATES PATENT AND TRADEMARK OFFICE
CERTIFICATE OF CORRECTION

PATENT NO. : 4,037,784
DATED : July 26, 1977
INVENTOR(S) : Louis J. Sabarly

It is certified that error appears in the above—identified patent and that said Letters Patent are hereby corrected as shown below:

Column 3, line 58, change "01" to -- θ1 --;
         line 59, change "so" to -- So --.

Column 4, line 1, change "01" to -- θ1 -- ;
         line 6, change "01" to -- θ1 -- ;
         line 9, change "po" to -- Po -- ;
         line 32, change "θT" to -- θ1 -- ;
         line 43, change "S1P1 = SoPo" to -- S1P1 + SoPo -- ;
         line 44, change "th" to -- the -- ;
         line 44, change "therefoe" to -- therefore -- ;
         line 47, change "th" to -- the -- ;
         line 62, change "distrubances" to -- disturbances -- .

Signed and Sealed this

Eighteenth Day of October 1977

[SEAL]

Attest:

RUTH C. MASON
*Attesting Officer*

LUTRELLE F. PARKER
*Acting Commissioner of Patents and Trademarks*